March 14, 1944. D. W. T. EVANS 2,344,293
DRAWBENCH GRIPPER CARRIAGE
Filed Nov. 17, 1942 3 Sheets-Sheet 3

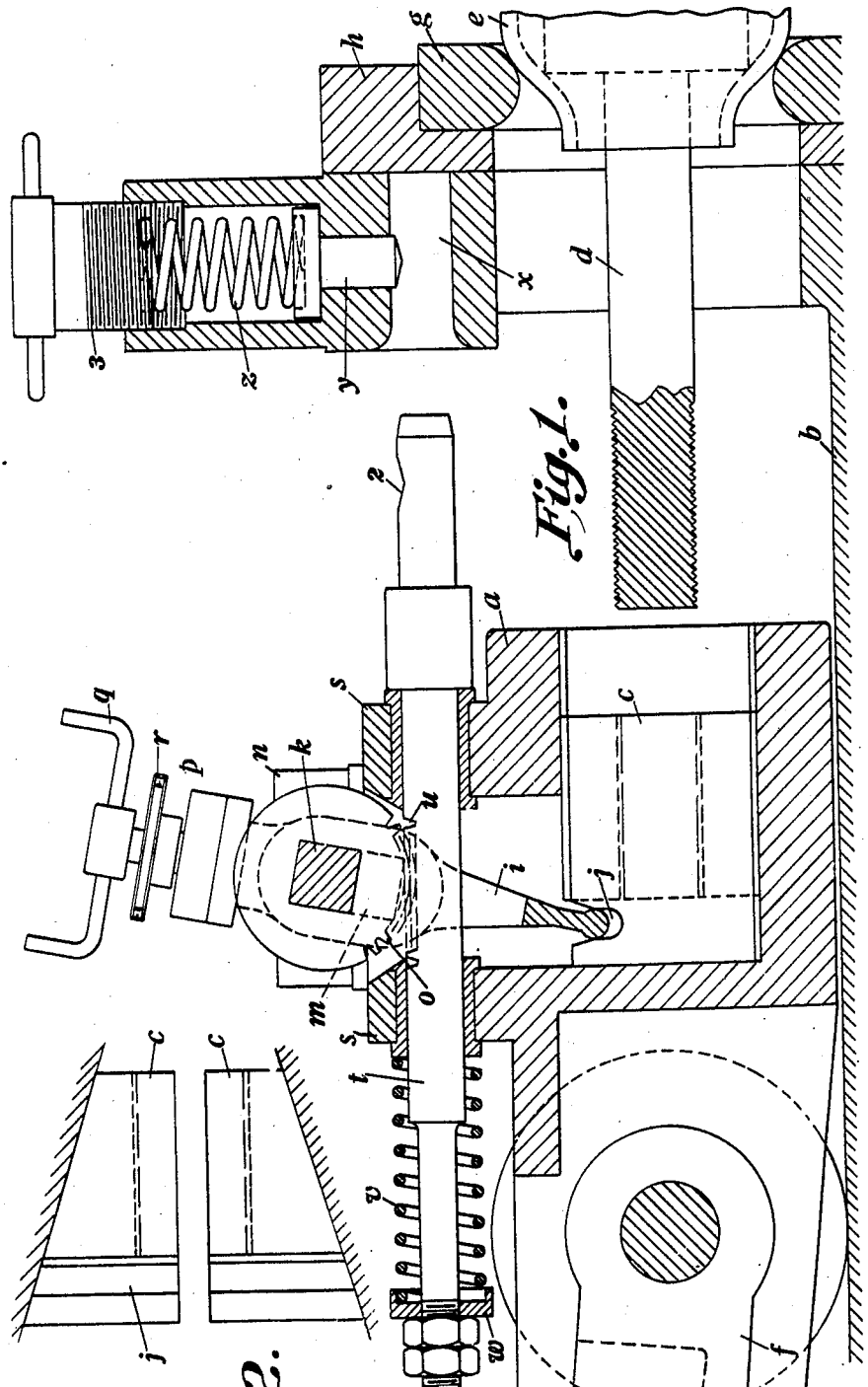

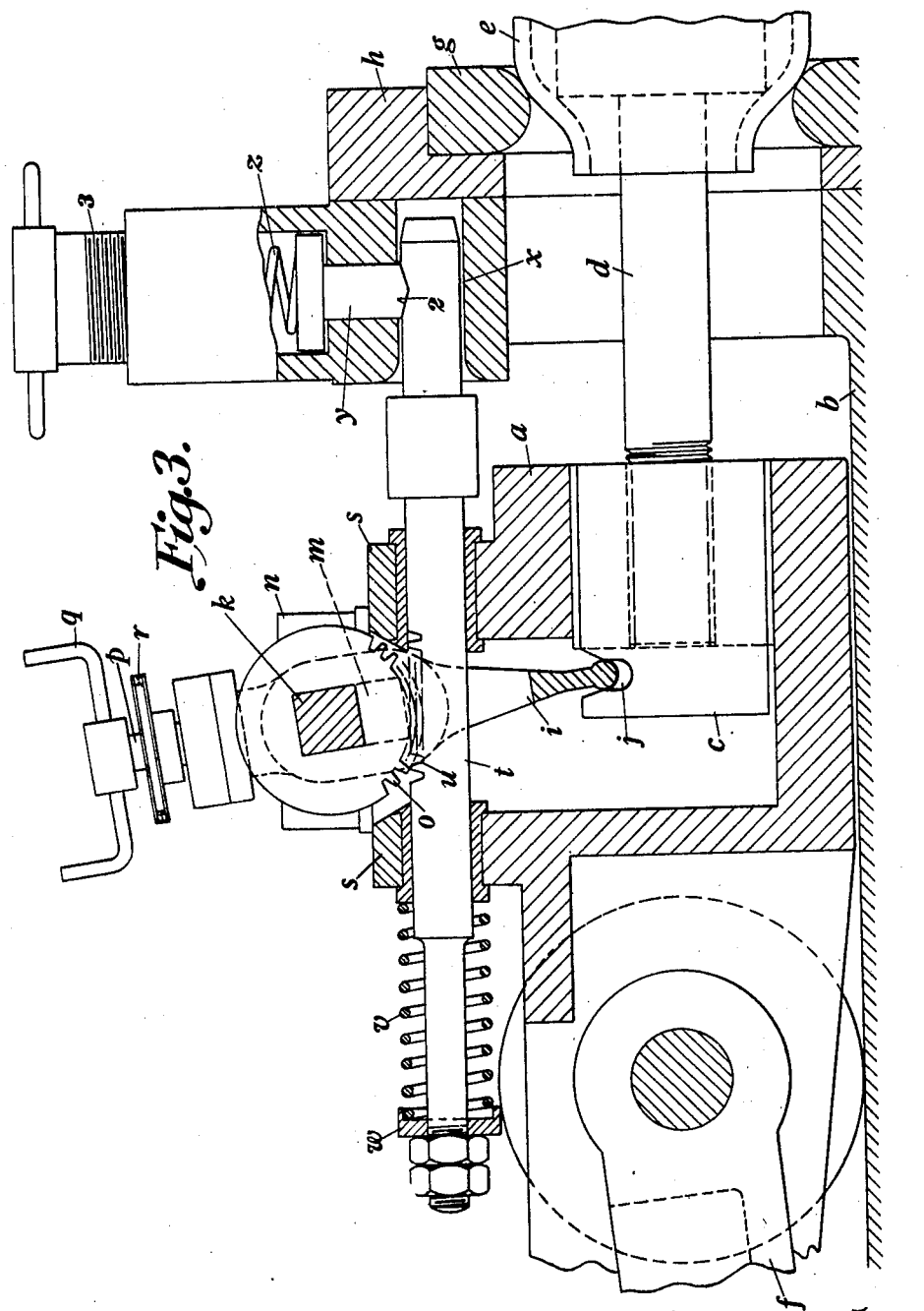

Inventor
D. W. T Evans
By Glascock Downing Seibold
Attys

Patented Mar. 14, 1944

2,344,293

UNITED STATES PATENT OFFICE 2,344,293

DRAWBENCH GRIPPER CARRIAGE

David William Thomas Evans, Sutton Coldfield, England, assignor to T. I. (Group Services) Limited, Birmingham, England Application November 17, 1942, Serial No. 465,876
In Great Britain November 21, 1941

6 Claims. (Cl. 205—24)

This invention relates to carriages used on draw benches for drawing tubes or other workpieces through dies, the carriages being of the kind having grippers in the form of a pair of slidable jaws adapted to grip between them the forward end of the workpiece or a pulling pin attached to the workpiece.

The object of the invention is to provide improved means for automatically closing the gripper jaws.

The invention comprises the combination of a lever adapted to engage the jaws, a slidable bar for actuating the lever, and means for temporarily holding the bar during the initial part of the movement of the carriage away from the die.

In the accompanying sheets of explanatory drawings—

Figure 1 is a sectional elevation of a part of a draw bench gripper carriage provided with the invention, the gripper jaws being in their open or inoperative positions.

Figure 2 is a fragmentary sectional plan illustrating the gripper jaws.

Figure 3 is a similar view to Figure 1 but with the gripper jaws in their closed or operative positions.

Figure 4:
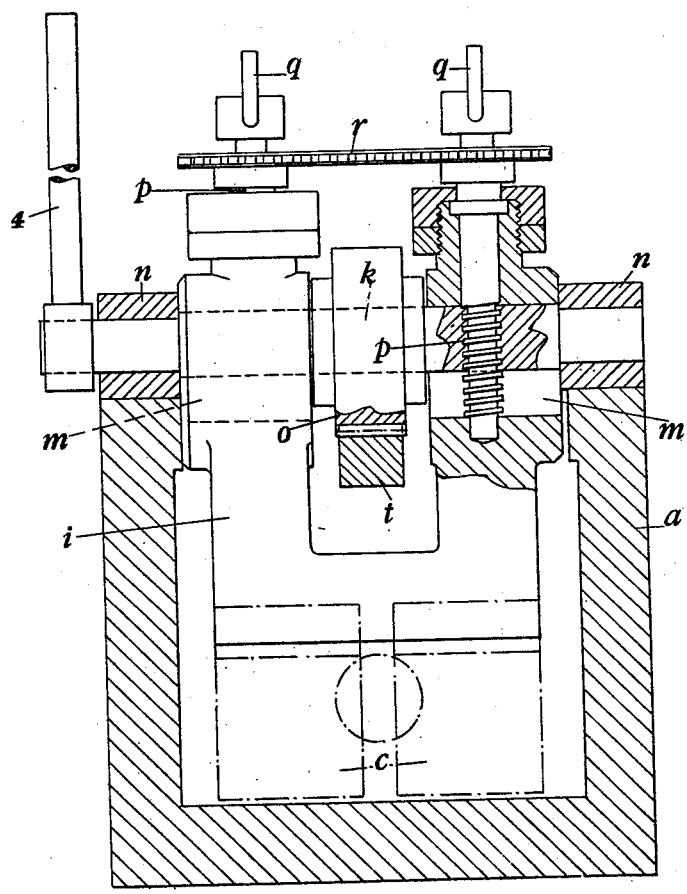
Figure 4 is a sectional end view illustrating the jaw-actuating lever and the associated parts.

In the drawings $a$ indicates the carriage which is movable along the bench $b$, and $c$ indicates the slidable gripper jaws which are adapted to grip between them the forward end of a pulling pin $d$ attached to the workpiece $e$. Alternatively the jaws may be adapted to grip the workpiece. The jaws $c$ are of the known kind having inclined side faces which by contact with correspondingly inclined abutment surfaces on the carriage cause the jaws to approach each other during sliding movement in one direction, and to recede from each other during sliding movement in the opposite direction. On the carriage $a$ is mounted the usual hook $f$ a part only of which is shown in the drawings. This hook is adapted to engage a chain (not shown) for moving the carriage $a$. When the pulling pin $d$ or the workpiece is gripped by the jaws $c$, movement of the carriage $a$ in the appropriate direction along the bench $b$ causes the workpiece to be drawn through a die $g$ in a fixed holder $h$ on the bench.

In applying the invention to the carriage $a$ I pivotally mount on the carriage a depending lever $i$ whose lower end is adapted to engage a transverse groove $j$ in the upper face of each of the slidable gripper jaws $c$. Preferably and as shown the lever $i$ is of substantially U-form, that is to say it comprises a pair of side members united at their lower ends by a cross member which engages the grooves $j$ in the jaws $c$. To enable the lever $i$ to be raised or lowered out of or into engagement with the jaws $c$, when it is required to change the jaws, the lever is carried by a transverse spindle $k$ which passes through slots $m$ in the side members of the lever and which is rotatably supported at its ends by bearings $n$ on the carriage $a$. The portion of the spindle $k$ which passes through the slots $m$ in the side members of the lever $i$ is of rectangular cross section so that it is incapable of rotary motion relatively to the lever. Also the portion of the spindle $k$ between the side members of the lever $i$ is formed or provided with a pinion or toothed segment $o$. Movement of the lever $i$ relatively to the spindle $k$ for effecting engagement of the lever with or disengagement of the lever from the jaws $c$ is effected by screws $p$ inserted through the upper ends of the side members of the lever and engaging screw threaded holes in the spindle. One or each of the screws $p$ is provided with an operating handle $q$ and is connected to the other through a chain and sprocket mechanism $r$, so that rotation of the handle or either handle effects simultaneous rotation of both screws. Alternatively the screws may be interconnected by spur or worm gearing.

In bearings $s$ on the carriage $a$ there is slidably supported a longitudinally arranged horizontal bar $t$ on which is formed a rack $u$ engaging the pinion or segment $o$ on the transverse spindle $k$. This bar $t$ is surrounded at the end remote from the die holder $h$ by a helical compression spring $v$ which bears at one end against the carriage $a$ and at the other end against an adjustable collar $w$ on the bar. Due to the interaction of the pinion or segment $o$ and the rack $u$, sliding movement of the bar $t$ in one direction causes the lever $i$ to open the jaws $c$, and in the opposite direction causes the lever to close the jaws. The spring $v$ tends to move the bar $b$ in the direction which causes the lever $i$ to open the jaws $c$. The end of the bar $t$ adjacent to the die holder $h$ occupies a hole $x$ in the holder when the carriage $a$ is in its initial position, the holder being provided with a plunger $y$ adapted under the action of a spring $z$ to engage a shallow V-shaped recess 2 in the bar $t$. The action of the spring $z$ on the plunger $y$ is adjustable by a screw-threaded plug 3.

When the carriage $a$ occupies its initial position the bar $t$ is held by the plunger $y$. After the end of the pulling pin $d$ or the work piece has been inserted between the gripper jaws $c$, the hook $f$ on the carriage is engaged with the abovementioned chain causing the carriage to begin its travel along the bench $b$. During the initial part of this movement the bar $t$ is held stationary by the plunger $y$, causing the lever $i$ to move the jaws $c$ into engagement with the pulling pin $d$ or workpiece. This condition is shown in Figure 3. The ratio of the length of the lever $i$ to the radius of the pinion or segment $o$ is made such that the movement of the jaws $c$ is effected rapidly and requires but a short movement of the carriage $a$. When the pulling pin $d$ or workpiece is tightly gripped by the jaws $c$ the plunger $y$ is no longer able to hold the bar $t$ and consequently the latter is carried forward by the carriage $a$.

So long as the workpiece $e$ is under the action of the die $g$ the gripper jaws $c$ retain their grip, but after the workpiece has passed through the die, the spring $v$ acting on the bar moves the latter in the direction for releasing the jaws. Subsequently the carriage $a$ is returned to its initial position and the bar $t$ is reengaged by the spring-loaded plunger $y$ in readiness for the next operation.

To enable the gripper jaws $c$ to be actuated alternatively by hand I provide a hand lever 4 on one end of the spindle $k$ carrying the lever $i$.

By my invention I am able to effect the actuation of the gripper jaws in a very satisfactory and convenient manner, and at the same time enable these jaws to be expeditiously changed.

The invention is not limited to the example above described as subordinate mechanical or constructional details may be varied to suit different requirements.

Having thus described my invention what I claim as new and desire to secure by Letters Patent is:

1. A draw bench gripper carriage of the kind specified having in combination a pair of gripper jaws slidably supported by the carriage, a lever pivoted on the carriage and adapted to engage the jaws, a slidable bar mounted on the carriage and adapted to actuate the lever, and means whereby the bar is temporarily engaged and held stationary during the initial part of the movement of the carriage away from the die.

2. A draw bench gripper carriage as claimed in claim 1 and having in combination with the bar, a spring whereby the bar is movable in the direction for causing the lever to open the jaws.

3. A draw bench gripper carriage of the kind specified having in combination a pair of slidable gripper jaws, a lever adapted to engage the jaws, a slidable bar for actuating the lever, a transverse supporting spindle through the agency of which the lever can be actuated by the slidable bar, a toothed member on the spindle, a rack provided on the bar and engaging the toothed member, and means for temporarily holding the bar during the initial part of the movement of the carriage away from the die.

4. A draw bench gripper carriage of the kind specified having in combination a pair of slidable gripper jaws, a lever comprising a pair of side members united by a cross member adapted to engage the jaws, a slidable bar, a transverse spindle through the agency of which the lever can be actuated by the bar, the said spindle being arranged to pass through the side members of and serve as a support for the lever, a toothed member provided on the spindle and situated between the side members of the lever, a rack provided on the bar and engaging the toothed member, and means for temporarily holding the bar during the initial part of the movement of the carriage away from the die.

5. A draw bench gripper carriage as claimed in claim 4 in which the side members of the lever are slotted to accommodate the supporting spindle, and have combined with them screws whereby the lever can be moved relatively to the said spindle to effect engagement with or disengagement from the jaws, means being provided for operatively interconnecting the screws.

6. A draw bench gripper carriage as claimed in claim 1, in which the means for temporarily holding the bar comprise in combination a fixed member having a hole for accommodating one end of the bar, and a spring loaded plunger carried by the said member and adapted by engagement with the said end of the bar to hold the latter stationary during the initial part of the movement of the carriage away from the die.

DAVID WILLIAM THOMAS EVANS.